United States Patent
Ihonen et al.

(10) Patent No.: US 7,790,330 B2
(45) Date of Patent: Sep. 7, 2010

(54) POLYMER FUEL CELL STRUCTURE

(75) Inventors: Jari Ihonen, Solna (SE); Frederic Jaouen, Solna (SE)

(73) Assignee: Powercell Sweden AB (SE)

( * ) Notice: Subject to any disclaimer, the term of this patent is extended or adjusted under 35 U.S.C. 154(b) by 685 days.

(21) Appl. No.: 10/248,304

(22) Filed: Jan. 7, 2003

(65) Prior Publication Data
US 2003/0091887 A1    May 15, 2003

Related U.S. Application Data

(63) Continuation of application No. PCT/SE01/01514, filed on Jun. 29, 2001, now abandoned.

(30) Foreign Application Priority Data
Jul. 7, 2000    (SE)    .................................... 0002601

(51) Int. Cl.
H01M 8/00    (2006.01)
H01M 4/00    (2006.01)
H01M 8/10    (2006.01)

(52) U.S. Cl. ..................... 429/523; 429/512; 429/513; 429/514; 429/534

(58) Field of Classification Search ................. 429/30, 429/34, 38, 39, 40, 41, 32, 35
See application file for complete search history.

(56) References Cited

U.S. PATENT DOCUMENTS

| 5,346,780 | A | * | 9/1994 | Suzuki | ........................ | 429/42 |
| 5,879,826 | A | | 3/1999 | Lehman et al. | | |
| 5,935,726 | A | | 8/1999 | Chow | | |
| 5,958,613 | A | | 9/1999 | Hamada | | |
| 6,007,933 | A | * | 12/1999 | Jones | ........................ | 429/38 |
| 2001/0041281 | A1 | * | 11/2001 | Wilkinson et al. | ............ | 429/34 |

FOREIGN PATENT DOCUMENTS

| EP | 0975039 A2 | 1/2000 |
| WO | WO 9852241 A1 | 11/1998 |

* cited by examiner

*Primary Examiner*—Dah-Wei D Yuan
*Assistant Examiner*—Steven Scully
(74) *Attorney, Agent, or Firm*—Novak Druce + Quigg LLP

(57) ABSTRACT

A polymer electrolyte fuel cell structure includes a proton exchange membrane (4). An anode catalyst layer (1,16) is located on one side of the proton exchange membrane. A cathode catalyst layer (7) is located on the opposite side of the proton exchange membrane, and a gas distribution layer (3,5) is arranged on each side of the proton exchange membrane (4). The anode side gas distribution layer (3) is a flat, porous structure having water channels (3a) formed in the surface facing the membrane (4). The anode side gas distribution layer (3) is enclosed by a coplanar, sealing plate (2) with water inlet channels coupled to the water channels (3a) in the gas distribution layer.

21 Claims, 7 Drawing Sheets

POLYMER FUEL CELL STRUCTURE

CROSS REFERENCE TO RELATED APPLICATIONS

The present application is a continuation patent application of International Application No. PCT/SE01/01514 filed 29 Jun. 2001, published in English pursuant to PCT Article 21(2) and which claims priority to Swedish Application No. 0002601-3 filed 7 Jul. 2000. Both applications are expressly incorporated herein by reference in their entireties.

BACKGROUND OF INVENTION

1. Technical Field

The present invention generally relates to fuel cells; and more particularly, to improvements in performance of polymer fuel cells.

2. Background of the Invention

Polymer fuel cells are on the fringe of commercialization. The progress made in catalyst and membrane research in the last few years has enabled very high power densities (>1 W/cm$^2$) with moderate efficiencies for the fuel cell (40%). The catalyst loading of electrodes has been reduced to 0.1 mg Pt/cm$^2$ while maintaining a high performance. The price of the perfluorinated sulfonic acid membranes such as the Nafion membrane is expected to decrease, with increasing production, while other proton conducting membrane candidates have been discovered.

Serious problems, however, are encountered when polymer fuel cell technology is scaled up to larger cells and stacks. One of the main problems, in the stacks themselves, is the water management, since the proton conducting membrane must be kept well humidified under operating conditions.

The dominating component, at the internal resistance loss in the stack, is due to the limiting proton conductivity of the membrane. Membranes tend to dry out, especially on the anode side, at high current densities, since proton migration drags water molecules away from the anode.

Drying of the anode does not only affect resistance, but also the kinetics of hydrogen reduction reaction (HRR) at the anode.

Therefore, in attempts to remedy this problem the anode side is often humidified more intensively than the cathode side. The cathode side of the cell can also be pressurized to use the pressure gradient over the membrane to press the water back to the anode. However, it is important that the water management does not impede the gas flow inside the cells.

One solution for this problem would be to use thinner membranes, but this approach has limitations since mechanical rigidity of the membrane must be sufficient.

Another solution is to have a direct water contact with the membrane at the anode side since the water content and conductivity of the membrane are much higher when the membrane is in equilibrium with water. Also, when liquid is evaporated inside the fuel cell, a considerable amount (40-50%) of the heat can be removed from the cell with the produced water vapor.

U.S. Pat. No. 5,958,613 relates to such direct water humidification of fuel cell membranes. Therein, a polymer fuel cell system is disclosed with a capability to moisten the solid-polymer film without providing a special humidifier that humidifies the fuel gas or the oxidizer gas, and that cools down the main cell body channels. In this patent, there is no disclosure of specified operation principles for a fuel cell stack, when the direct humidification is applied.

U.S. Pat. No. 5,935,726 discloses a method and apparatus for improved humidification of membranes in polymer fuel cells by periodically reversing the flow direction of the oxidant stream through a fuel cell flow field. This patent, however, is not concerned with cooling of the fuel cell.

SUMMARY OF INVENTION

Despite the numerous attempts to improve the water management in polymer fuel cells, there is still room for improvements. Thus, an object of the present invention is to provide means for achieving better humidification, at low cost and with low cell complexity. The trade-off between performance and cost should be acceptable.

In the cell structure of the present invention, an aqueous phase, preferably water, is used for direct humidification of the membrane. The polymer electrolyte fuel cell structure configured according to the teachings of the present invention includes a proton exchange membrane, an anode catalyst layer on one side of the proton exchange membrane, a cathode catalyst layer on the opposite side of the proton exchange membrane, and a gas distribution layer on each side of the proton exchange membrane. The anode side gas distribution layer is a flat, porous structure having water channels formed in the surface facing the membrane, and the anode side gas distribution layer is surrounded or bordered along its edge surfaces by a coplanar sealing frame with water inlet channels coupled to the water channels in the gas distribution layer.

By way of the present invention, it is possible to maintain a direct water contact with the membrane at the anode side. This is beneficial for the operation of the cell, since the water content and the conductivity of the membrane are much higher when the membrane is in equilibrium with water. Also, when water is evaporated inside the fuel cell, a considerable amount of the heat that is produced in the cell can be removed from the cell by means of the produced water vapor.

BRIEF DESCRIPTION OF DRAWINGS

The invention will now be further described in the following, in a non-limiting way with reference to the accompanying drawings in which.

DETAILED DESCRIPTION

Figure 1:
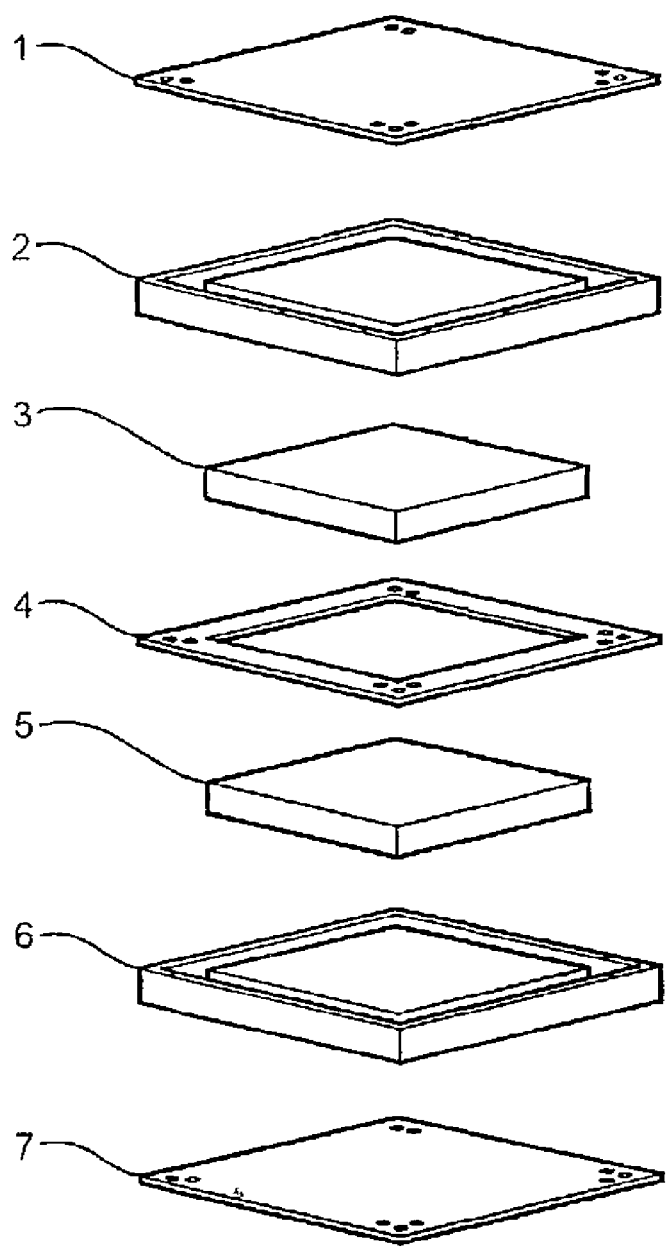
FIG. 1 is a perspective exploded assembly view of an exemplary arrangement configured according to the present invention showing the elements of the polymer fuel cell structure.
Figure 2:
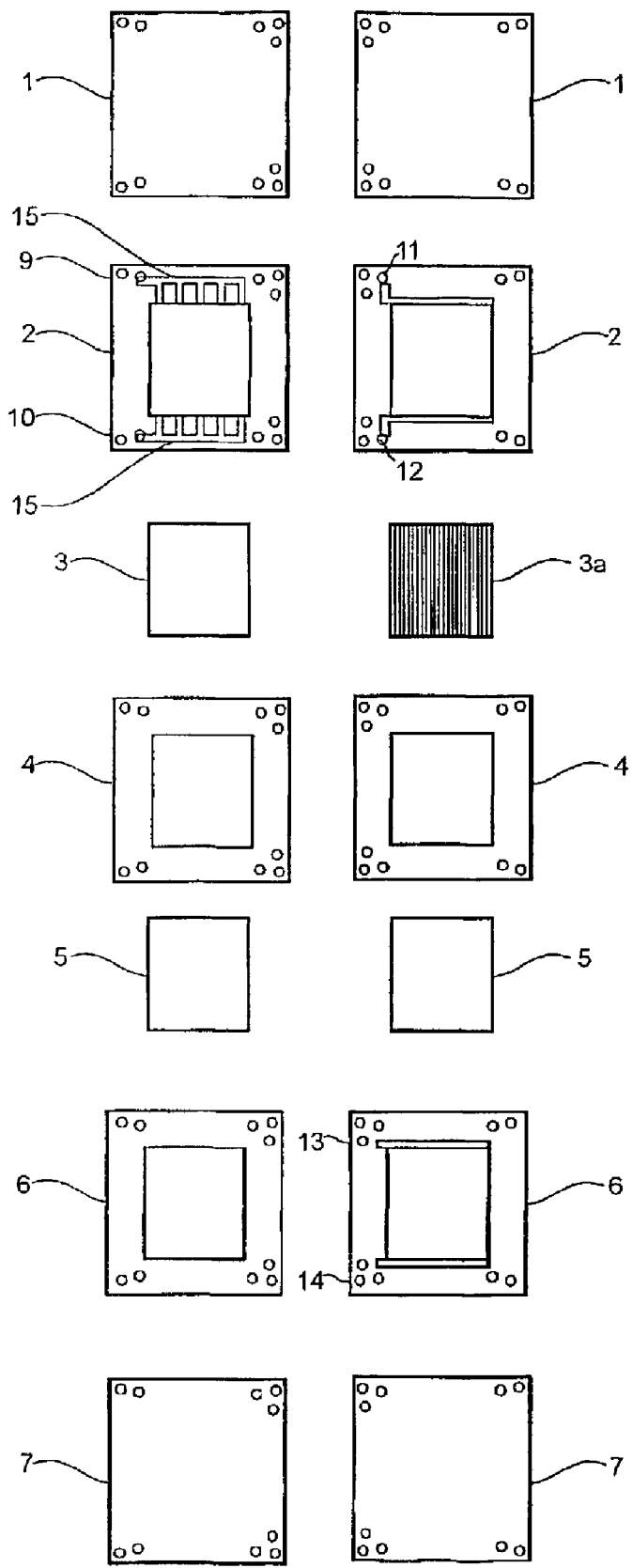
FIG. 2 shows plan views, from both above and below, of each of the elements of the arrangement of FIG. 1.

A preferred embodiment of the fuel cell structure according to the present invention is shown in FIGS. 1 and 2. The fuel cell includes a conductive anode plate 1. An anode sealing frame 2 is provided adjacent the bipolar plate 1. This frame is provided with a central, rectangular opening extending in a direction corresponding to the thickness of the sealing frame (e.g., through the thickness of the frame) and into which an anode gas distribution layer 3 fits such that the anode gas distribution layer 3 is surrounded or bordered along its edge surfaces by the sealing frame 2. The frame 2 is also provided with an anode gas inlet 9 and an outlet 10 and gas distribution channels are formed as well as water inlets and outlets 11, 12 respectively. The anode gas distribution layer 3 is provided with a plurality of narrow water channels 3a on the opposite side of the layer 3, with reference to the anode plate 1. A proton exchange membrane 4 is arranged for cooperation with the plate 1 for sandwiching the frame 2 and the diffusion layer 3 therebetween.

The cathode side of the fuel cell is structured in a similar manner as the anode side. Thus, the opposite side of the membrane 4 is arranged for cooperation with a conductive cathode plate 7 for sandwiching a cathode sealing frame and a cathode gas distribution layer 5 therebetween, with the cathode gas distribution layer 5 surrounded or bordered along its edge surfaces by the cathode sealing frame 6. The cathode diffusion layer 5 is not provided with any water channels as the anode diffusion layer 3. The cathode sealing frame 6 is provided with a cathode gas inlet 13 and an outlet 14.

In FIG. 2 the detailed structure of water channels and how the water distribution is organized in a stack is shown. The left-hand side of the figure shows the upside and the right-hand side of the figure shows the down side.

Each sealing frame 2 in a stack has a number of holes made through it. The holes located in the corners are for clamping bolts used when assembling a number of cell units to a cell stack. The remaining holes, together with corresponding holes in the other components of a stack, form channels through the stack for water, fuel gas, and oxidant gas, respectively.

Furthermore, the upper side (as defined above) of the sealing frame 2 has gas channels 15 running along the inner edge of the frame like structure. A number of distribution apertures (in the figure there are five) are diverted from each channel 15, so as to distribute incoming gas into the diffusion/distribution material located in the frame. The second hole from the left in the upper array of holes (as shown in the figure) is the inlet channel 9 for incoming gas, and the second hole from the left in the lower array of holes is the outlet channel 10 for gas exiting from the cell on the anode side. The anode sealing frame 2 has the same configuration of gas channels regardless of position in the stack.

On the down side (as defined above) of each sealing frame 2, channels are provided for water that have a common water inlet 11 and a common water outlet 12.

In the middle of the stack, the membrane 4 is arranged to separate the anode and cathode parts of the stack. On the cathode side, a cathode gas distribution layer 5 is provided, and then there is sealing frame 6 for the cathode gas distribution layer 5 wherein cathode gas inlet and outlet 13, 14 are formed in a similar way as in the anode sealing frame 2.

Figure 3:
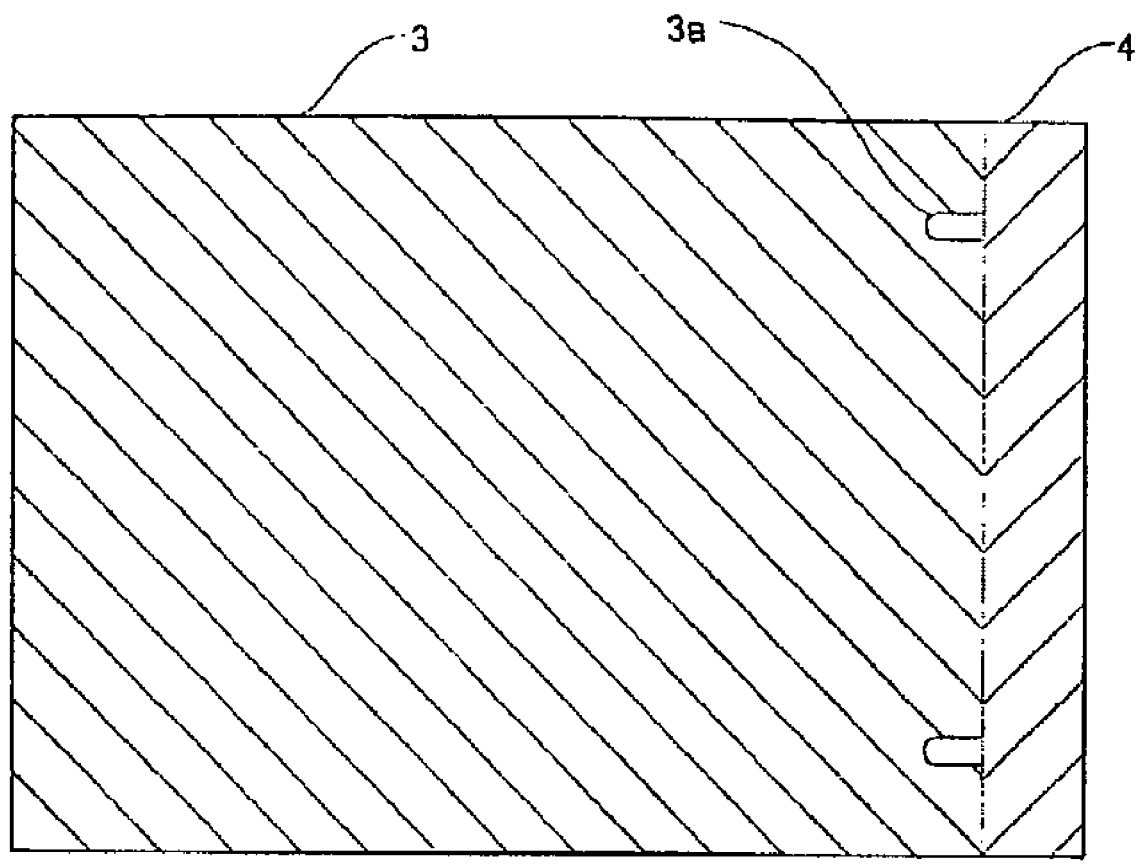
FIG. 3 is a cross-sectional view shown in larger scale, through a gas distribution layer that is included in the arrangement of FIGS. 1 and 2.

FIG. 3 shows a more detailed structure of a gas distribution layer. The layer 3 is provided with water channels 3a adjacent the membrane 4. In a typical embodiment of the invention, the water channels 3a may have a width of about 50-100 u m, a depth of about 100-300 u m and the channels may be separated by a distance of about 200-1000 u m. By making the water channels narrow, blocking of the channels due to membrane expansion is avoided. One possible method of producing the channels 3a would be to press the gas distribution layer against a template having a ridge structure surface corresponding to the desired water channel structure.

Figure 4:
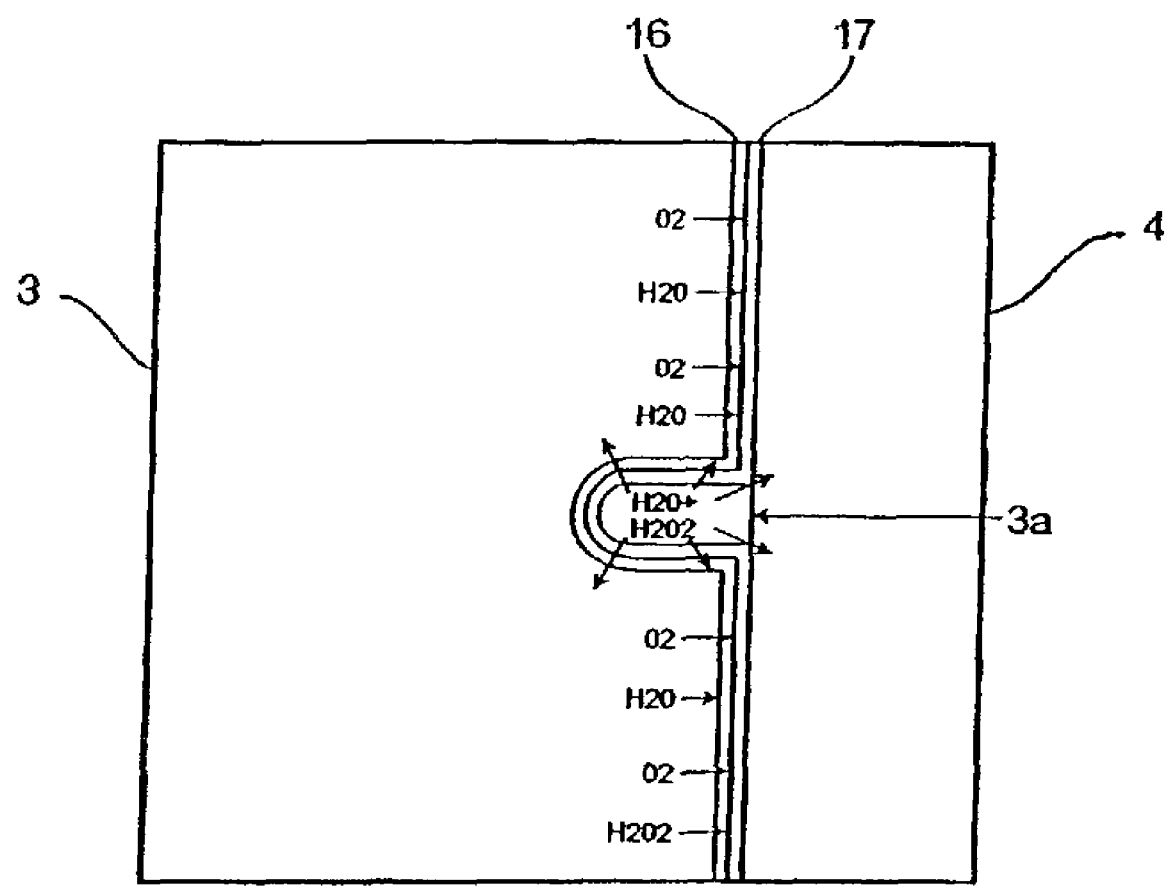
FIG. 4 shows a second embodiment of an exemplary gas distribution layer.

FIG. 4 shows an embodiment of the invention, where the gas distribution layer 3 is provided with a catalyst layer 16. A non-porous or almost non-porous proton conducting polymer layer 17 is arranged so that it lines the water channel.

In this embodiment, hydrogen peroxide or other oxygen evolving compounds may be added to the humidification and cooling water which is fed into the cell on the anode side. Since the oxygen is released in the vicinity of the catalyst, CO adsorption at the anode catalyst may be avoided in a manner that is effective and which leads to less consumption of oxygen. Part of the hydrogen peroxide will be decomposed at the electrode surface to generate oxygen with the reaction $H_2O_2^- \to H_2O + 1/2 O_2$. In this system, possible benefits of hydrogen peroxide are achieved even if the decomposition is not complete. The path of the hydrogen peroxide and evolved oxygen is marked as arrows in FIG. 4. However, this method can be applied to other direct water humidification systems in polymer fuel cells.

Figure 5:
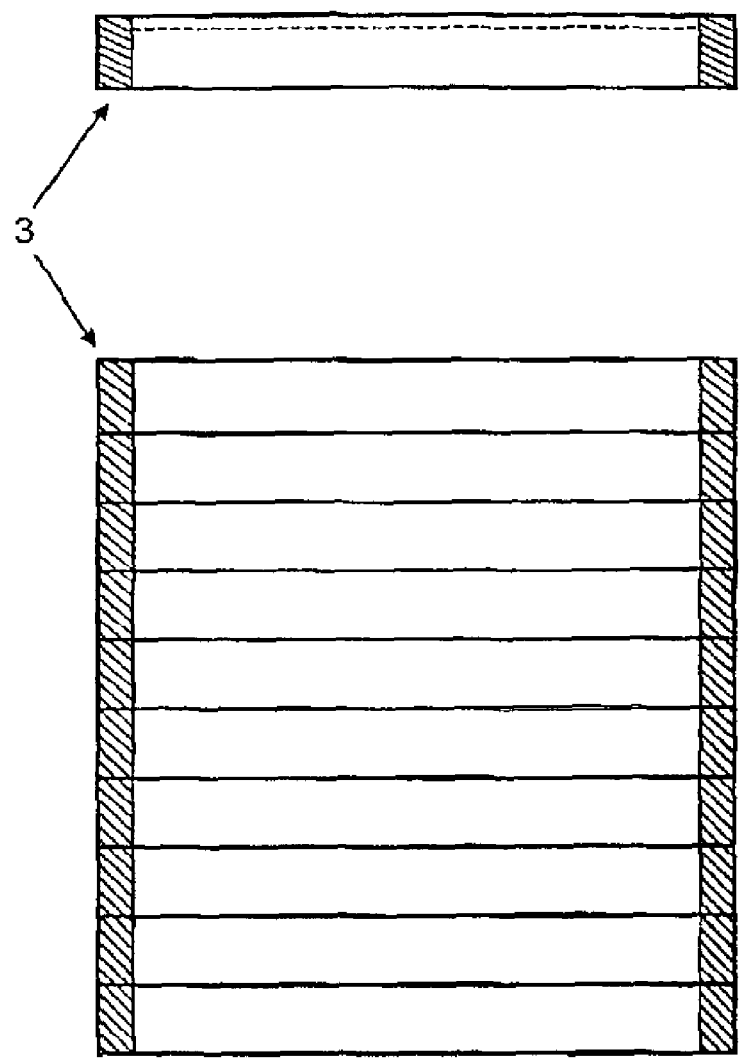
FIG. 5 shows a third embodiment of an exemplary gas distribution layer.

FIG. 5 shows a gas distribution layer 3, the edges of which have been treated with a hydrophobous polymer to prevent the water from entering the cell gas chamber. In this structure, there are no gas channels in the bipolar plates 1,7 or in the gas distribution layers 3, 5. The gas distribution layers can have a porosity exceeding ninety percent, they are good electrical conductors, and have proper corrosion resistance against acid proton conducting membrane.

Figure 6:
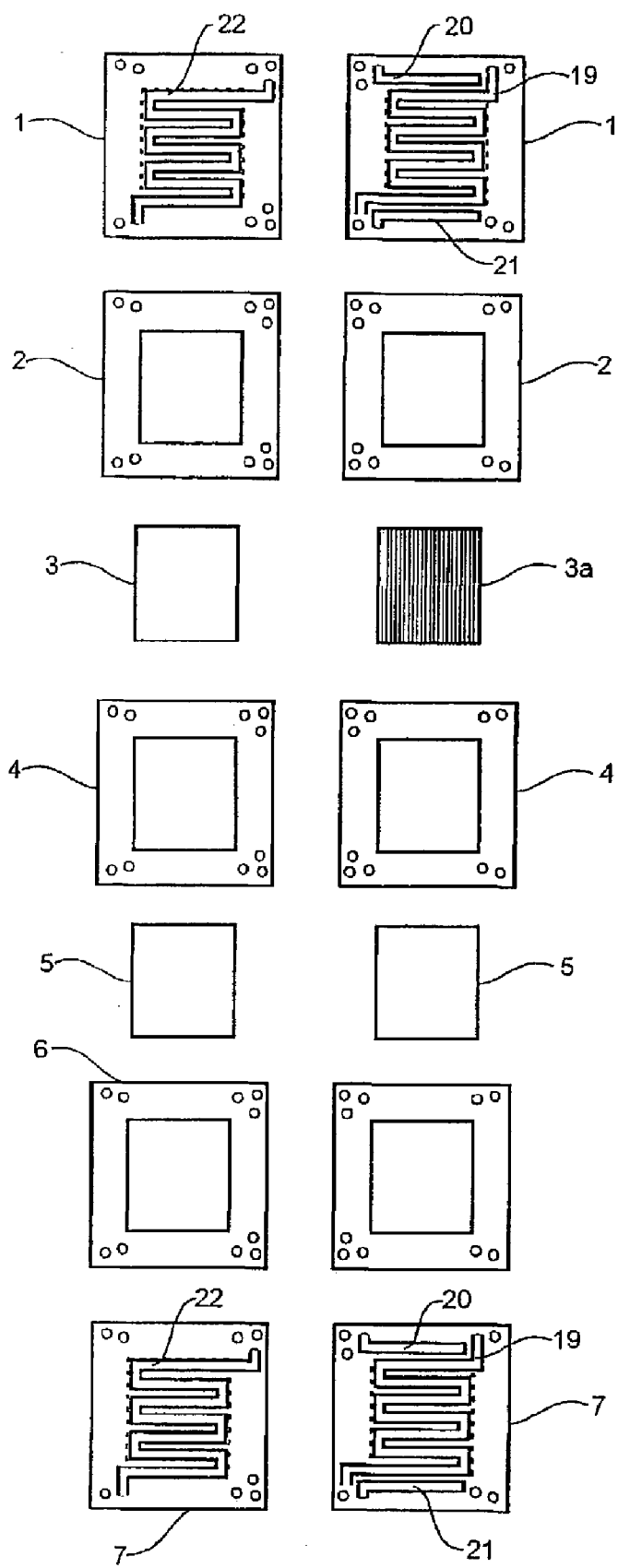
FIG. 6 shows, in the same manner as FIG. 2, an alternative structure layout for the arrangement.

The present invention may be combined with the conventional serpentine channel structure. This principle is illustrated in FIG. 6. The same reference numerals have been used as in the embodiment according to FIG. 2. The anode layer side of each bipolar plate 1,7 may be provided with an anode gas channel 19 and at least one water inlet 20. A water outlet 21 may also be provided. The cathode layer side of each bipolar plate is provided with at least one cathode gas channel 22.

Figure 7:
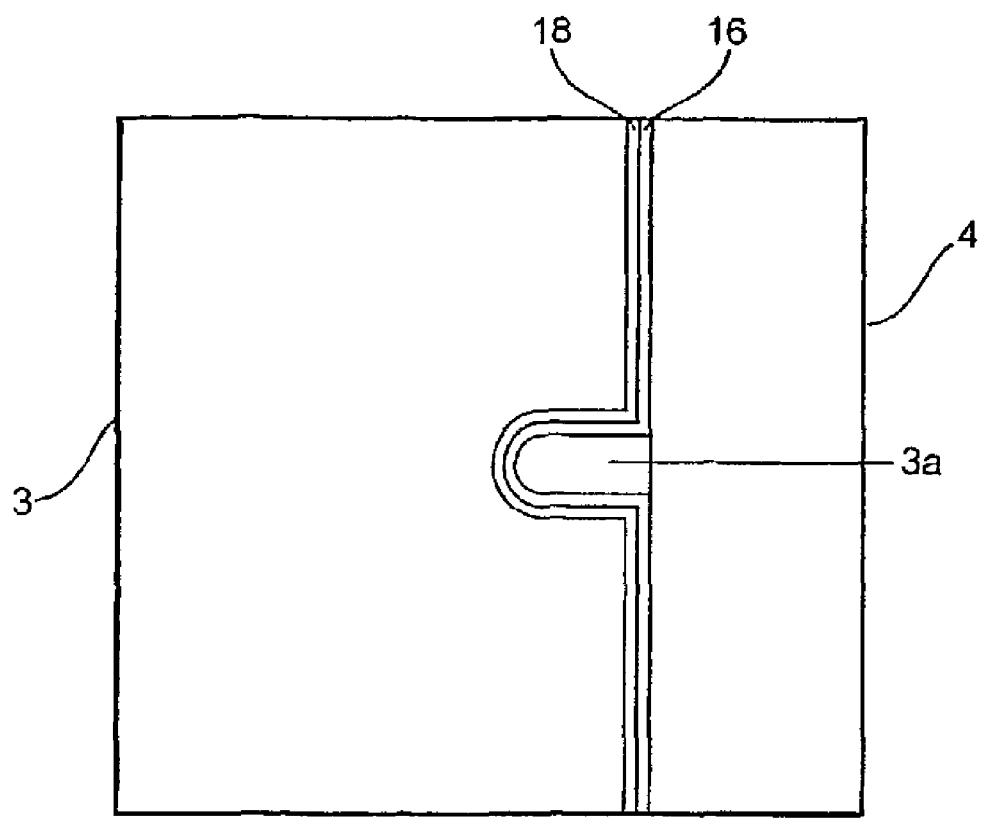
FIG. 7 shows still another embodiment of an exemplary gas distribution layer.

An alternative structure for the water channels is presented in FIG. 7. In this embodiment of the invention, the catalyst layer 16 is located on top of the membrane 4. A hydrophobous layer 18 is positioned between the membrane and the gas distribution layer. The function of this layer 18 is to let gas diffuse to the electrode (catalyst layer), but not let the water escape from the water channel 3a.

An embodiment of the invention configured according to FIG. 7 may be used for operation of a liquid-gas direct methanol fuel cell. In such an embodiment, the anode side of the cell is fed with a liquid water-methanol mixture, which is totally or partially evaporated in the cell. The liquid mixture is fed in such a way that most part of the anode electrode is in contact with a thin film of liquid methanol-water mixture. The remaining area of the anode electrode is in contact with the gas phase free from liquid. This is done in order to enable both fast release of gaseous carbon dioxide as well as for humidifying the membrane by water vapor reactant to remaining part of the anode area. Water and methanol are transferred from fuel feeding channels to the anode electrode both directly and via gas phase. This is illustrated by means of arrows in FIG. 7. The above-described method may also be applied to other types of fuel cell structures that are direct liquid cooled.

The water channel structure is preferably applied to the anode side. However, this structure can also be applied to the cathode side or to both sides simultaneously.

The invention is not limited to the above-described embodiments; instead, modifications are possible within the scope of the following patent claims.

The invention claimed is:

1. A polymer electrolyte fuel cell structure, comprising:
   a proton exchange membrane having an anode side and an opposite, cathode side;
   an anode catalyst layer located on the anode side of the proton exchange membrane;
   a cathode catalyst layer located on the cathode side of the proton exchange membrane;
   a sealing frame located on each of the anode side and the cathode side of the proton exchange membrane and generally adjacent to the proton exchange membrane, with each of the sealing frames having an opening therein that extends in a direction corresponding to the thickness of the sealing frame;
   a gas distribution layer located on each of the anode side and the cathode side of the proton exchange membrane and within the opening in a respective one of the sealing frames so as to be near the proton exchange membrane with the respective sealing frames bordering the gas distribution layers along edge surfaces thereof; wherein at least one of the gas distribution layers has a flat, porous structure with aqueous phase gas-distribution-layer channels being formed in a surface thereof that faces toward a corresponding surface of the proton exchange membrane, with the aqueous phase gas-distribution-layer channels extending generally parallel to each other and generally parallel to the surface of the gas distribution layer in which they are formed;
   an anode gas inlet;
   a first, anode gas passageway that provides fluid communication from the anode gas inlet to the gas distribution layer that is located on the anode side of the proton exchange membrane;
   an anode gas outlet;
   a second, anode gas passageway that provides fluid communication from the gas distribution layer that is located on the anode side of the proton exchange membrane to the anode gas outlet;
   a cathode gas inlet;
   a third, cathode gas passageway that provides fluid communication from the cathode gas inlet to the gas distribution layer that is located on the cathode side of the proton exchange membrane;
   a cathode gas outlet;
   a fourth, cathode gas passageway that provides fluid communication from the gas distribution layer that is located on the cathode side of the proton exchange membrane to the cathode gas outlet;
   a first aqueous-phase material inlet;
   a fifth, aqueous-phase material passageway that provides fluid communication from the first aqueous-phase material inlet to the gas-distribution-layer aqueous phase channels, wherein said gas-distribution-layer aqueous phase channels are open-sided along the lengths thereof but, at the same time, bounded by corresponding portions of said corresponding surface of the proton exchange membrane such that aqueous-phase material that enters the gas-distribution-layer aqueous phase channels from the fifth, aqueous-phase material passageway is directly exposed to and in direct contact with said corresponding portions of said corresponding surface of the proton exchange membrane;
   a first aqueous-phase material outlet; and
   a sixth, aqueous-phase material passageway that provides fluid communication from the gas-distribution-layer aqueous phase channels to the aqueous-phase material outlet.

2. The structure as recited in claim 1, wherein the gas-distribution-layer aqueous phase channels have a width of about 50 μm to about 100 μm.

3. The structure as recited in claim 1, wherein the gas-distribution-layer aqueous phase channels have a depth of about 100 μm to about 300 μm.

4. The structure as recited in claim 1, wherein the gas-distribution-layer aqueous phase channels are separated from each other by a distance of about 200 μm to about 1000 μm.

5. The structure as recited in claim 1, wherein said gas-distribution-layer aqueous phase channels are formed in the gas distribution layer that is located on the anode side of the proton exchange membrane.

6. The structure as recited in claim 5,
   wherein the gas distribution layer that is located on the cathode side of the proton exchange membrane is a flat, porous structure and also has gas-distribution-layer aqueous phase channels that are formed in a surface thereof that faces toward a corresponding cathode-side surface of the proton exchange membrane and that extend generally parallel to each other and generally parallel to the surface of the cathode-side gas distribution layer in which they are formed,
   the structure further comprising
      a second aqueous-phase material inlet;
      a seventh, aqueous-phase material passageway that provides fluid communication from the second aqueous-phase material inlet to the gas-distribution-layer aqueous phase channels that are formed in the cathode-side gas distribution layer, wherein the gas-distribution-layer aqueous phase channels that are formed in the cathode-side gas distribution layer are open-sided along the lengths thereof but, at the same time, bounded by corresponding portions of the corresponding cathode-side surface of the proton exchange membrane such that aqueous-phase material that enters the gas-distribution-layer aqueous phase channels that are formed in the cathode-side gas distribution layer from the seventh, aqueous-phase material passageway is directly exposed to and in direct contact with said corresponding portions of said corresponding cathode-side surface of the proton exchange membrane;
      a second aqueous-phase material outlet; and
      an eighth, aqueous-phase material passageway that provides fluid communication from the gas-distribution-layer aqueous phase channels that are formed in the cathode-side gas distribution layer to the second aqueous-phase material outlet.

7. The structure as recited in claim 1, wherein the gas-distribution-layer aqueous phase channels are lined with a hydrophobic coating.

8. The structure as recited in claim 1, wherein a bipolar plate is located on the side of each sealing frame that is distal from the proton exchange membrane.

9. The structure as recited in claim 8, wherein each bipolar plate has an anode catalyst layer on one side and a cathode catalyst layer on the opposite side.

10. The structure as recited in claim 9,
    wherein the cathode-catalyst-layer side of each bipolar plate has at least one cathode gas channel, which constitutes said third, cathode gas passageway, and
    wherein the anode-catalyst-layer side of each bipolar plate has an anode gas channel, which constitutes said first, anode gas passageway, and at least one inlet that constitutes said aqueous-phase-material inlet.

11. The structure as recited in claim 1, wherein the anode catalyst layer is located on the surface of the anode-side gas distribution layer that faces toward the proton exchange membrane.

12. The structure as recited in claim 1, wherein a comparatively non-porous layer of a proton-conducting material is provided in the gas-distribution-layer aqueous phase channels by means of which water can be retained within the gas-distribution-layer aqueous phase channels.

13. The structure as recited in claim 1, wherein the cathode catalyst layer is located on the surface of the cathode-side gas distribution layer that faces toward the proton exchange membrane.

14. The structure as recited in claim 1, wherein at least one of the anode catalyst layer and the cathode catalyst layer is disposed on the surface of the proton exchange membrane.

15. The structure as recited in claim 1, wherein a comparatively non-porous layer of a highly gas permeable material is provided in the gas-distribution-layer aqueous phase channels.

16. A polymer electrolyte fuel cell structure comprising:
a proton exchange membrane having an anode side and an opposite, cathode side;
a sealing frame located on each of the anode side and the cathode side of the proton exchange membrane and generally adjacent to the proton exchange membrane, with each of the sealing frames having an opening therein that extends in a direction corresponding to the thickness of the sealing frame; and
a gas distribution layer located on each of the anode side and the cathode side of the proton exchange membrane and within the opening in a respective one of the sealing frames so as to be near the proton exchange membrane with the respective sealing frames bordering the gas distribution layers along edge surfaces thereof; wherein at least one of the gas distribution layers has a flat, porous structure with aqueous phase gas-distribution-layer channels being formed in a surface thereof that faces toward a corresponding surface of the proton exchange membrane, with the aqueous phase gas-distribution-layer channels extending generally parallel to each other and generally parallel to the surface of said at least one the gas distribution layer in which they are formed, said aqueous phase channels being open-sided along the lengths thereof but, at the same time, bounded by corresponding portions of said corresponding surface of the proton exchange membrane.

17. The polymer electrolyte fuel cell structure of claim 16, wherein one side of said proton exchange membrane has an anode catalyst layer located thereon and the opposite side of said proton exchange membrane has a cathode catalyst layer located thereon.

18. The polymer electrolyte fuel cell structure of claim 17, wherein said anode catalyst layer and said cathode catalyst layer separate said proton exchange membrane from respective gas distribution layers on each side of said proton exchange membrane.

19. A polymer electrolyte fuel cell structure comprising:
an anode catalyst layer;
a cathode catalyst layer;
a proton exchange membrane located between said anode catalyst layer and said cathode catalyst layer,
a gas distribution layer positioned between said proton exchange membrane and said anode catalyst layer or said cathode catalyst layer, said gas distribution layer having a flat, porous structure with gas-distribution-layer aqueous phase channels formed in a surface thereof that faces toward a corresponding surface of the proton exchange membrane, the gas-distribution-layer aqueous phase channels extending generally parallel to each other and generally parallel to the surface of said gas distribution layer and being bordered along edge surfaces thereof by a sealing frame having aqueous phase inlet channels that are in communication with the gas-distribution-layer aqueous phase channels in said gas distribution layer.

20. The polymer electrolyte fuel cell structure of claim 19, wherein said gas distribution layer is located between said proton exchange membrane and said anode catalyst layer.

21. The polymer electrolyte fuel cell structure of claim 20, further comprising a second gas distribution layer that is located between said proton exchange membrane and said cathode catalyst layer.

* * * * *